Dec. 3, 1929.　　　H. F. NORTON　　　1,737,610
WINDSCOOP
Filed Oct. 10, 1925
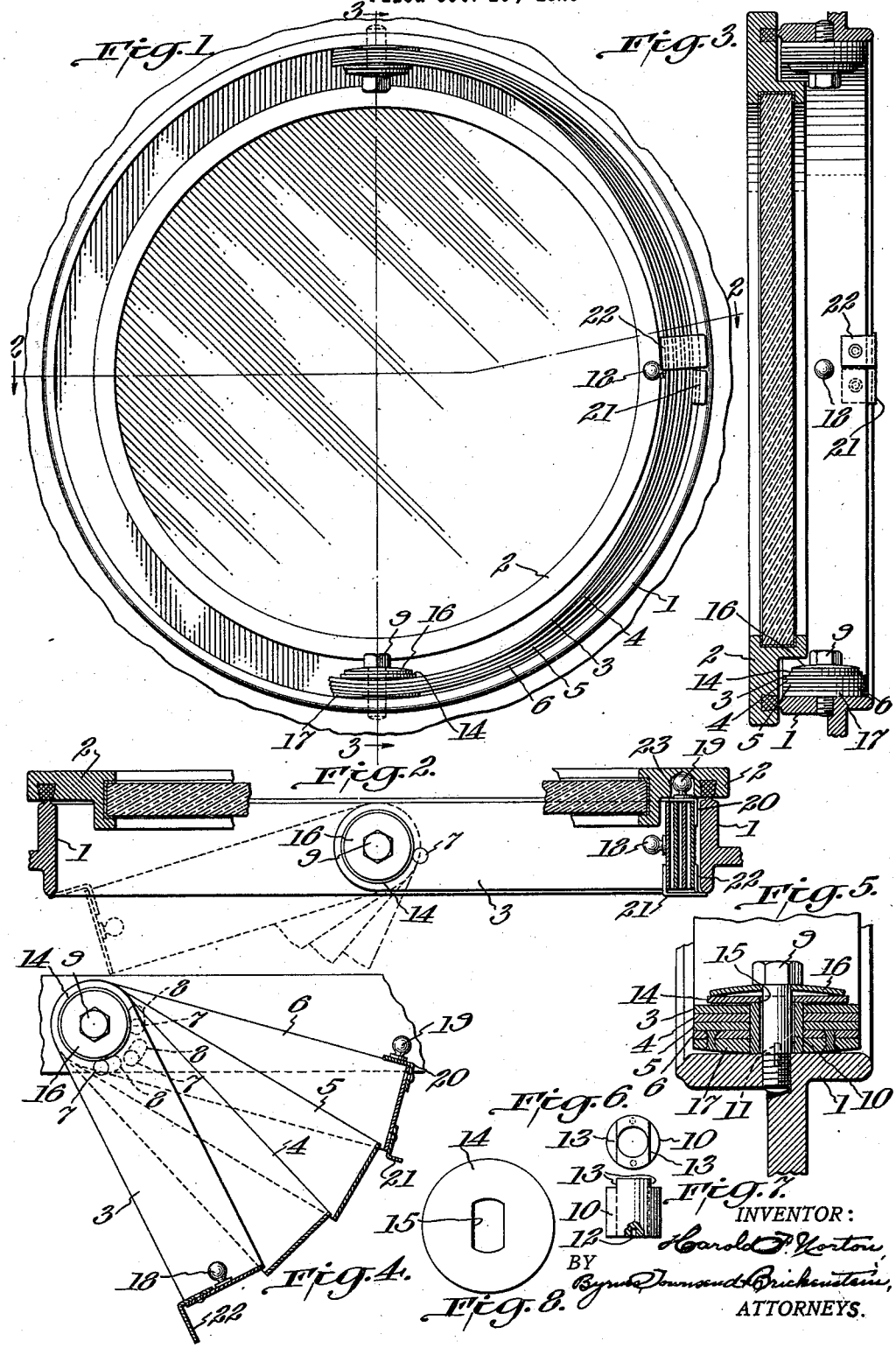
INVENTOR:
Harold F. Norton
BY
Byrne Townsend & Brickenstein
ATTORNEYS.

Patented Dec. 3, 1929

1,737,610

UNITED STATES PATENT OFFICE

HAROLD F. NORTON, OF NEWPORT NEWS, VIRGINIA

WIND SCOOP

Application filed October 10, 1925. Serial No. 61,799.

This invention relates to windscoops and particularly to a folding windscoop adapted to be installed in a permanent manner in the airport frame of a vessel.

Various types of windscoops have been proposed, both of metal and of canvas, but these have been found to be unsatisfactory because they were subject to damage and to loss upon removal from the airport.

An object of the present invention is to provide a windscoop which may be permanently installed in an airport of the usual construction. More particularly, an object of the invention is to provide a folding windscoop which will not interfere with the closing of the airport either when it is in closed or in open position.

In the accompanying drawings which illustrate one embodiment of the invention, Figure 1 is a front elevation of an airport frame having a windscoop positioned therein; Figure 2 is a fragmentary horizontal section taken on line 2—2 of Figure 1; Figure 3 is a vertical central section on line 3—3 of Figure 1; Figure 4 is a fragmentary horizontal section of a windscoop on a larger scale; Figure 5 is an enlarged vertical section through one bearing of the windscoop; Figures 6 and 7 are an end view and a side elevation, respectively, of the sleeve which forms a part of the bearing; and Figure 8 is a plan view of a washer used in the bearing.

In the drawings the airport frame which is indicated by the numeral 1 is of standard or desired construction, the airport being provided with the usual glass frame 2. The windscoop comprises a plurality of plates 3, 4, 5 and 6 which are pivotally supported upon bearings located on the vertical center line of the airport frame. The several plates are of substantially the same width as the thickness of the airport frame 1 and are so shaped as to conform to the outline of the airport, the several plates being of slightly different lengths to permit the closing of the windscoop to lie within the frame. Inner plates 3, 4 and 5 each carry a pin 7 which projects into an arcuate slot 8 formed in the next outer plate for limiting the relative movement of adjacent plates. With circular and oval airports, the ends of the plates may be flattened to lie in planes normal to the axis of rotation of the plates, but an equally satisfactory construction is possible with plates which are curved throughout their length, as shown in Fig. 1. In either case, the bearings at the top and bottom of the windscoop must be so constructed that the movement of the plates will not loosen the attaching means, and at the same time the bearing must exert a yielding pressure upon the plates to hold them in adjusted position.

As shown in Figure 5 the ends of the plates are secured to the frame 1 by a bolt 9 which threads into an opening in the frame. A sleeve 10 surrounds the bolt 9 and is fixed against rotation on the frame by means of a pin 11 which enters an opening 12 in the base of the sleeve. The outer end of the sleeve 10 is made non-circular in cross section, for example by grooves 13 formed in opposite sides of the sleeve, and this non-circular end of the sleeve carries a washer 14 which is formed with an aperture 15 conforming to the shape of the non-circular portion of the sleeve. A spring washer 16 rests upon the non-rotatable washer 14 and may be compressed by the bolt 9 to provide the desired frictional resistance to the movement of the several leaves of the windscoop. A bearing washer 17, preferably of brass or similar material has a spherically shaped lower face, while the upper face is that of a cylindrical surface of the same curvature as that of the adjacent face of the outer plate 6. The washer 17 turns with the plate 6, being connected thereto by means of rivets or by welding. As the bolt 9 does not contact with any parts which may rotate as the windscoop is opened or closed, it is obvious that there is no tendency for the bearings to work loose.

For convenience in manipulating the windscoop, the inner leaf 3 is provided with an operating knob or handle 18 at the central portion thereof and the outer leaf is provided with a similar knob 19 which is carried by an angle plate 20 attached to the center part of the plate 3 at the inner edge thereof. The outer plate 6 and the inner plate 3 are provided with projecting stop members 21 and 22, respectively, which engage the outer edge of the frame 1 when the windscoop is completely closed. If necessary the flange of the glass frame 2 may be recessed as at 23 to receive the knob 19.

The windscoop may be opened to occupy the position illustrated in Figure 4 or it may be pushed around to the other side of the airport, as shown by the dotted lines in Figure 2, to form a scoop for wind coming from the other direction. The stops 21 and 22 prevent the windscoop from moving into the space which may be occupied by the glass frame when the windscoop is closed and the stop 22 prevents the windscoop from entering the frame 1 when the scoop is moved to the further limit of its range of movement. It will be noted that the windscoop is permanently secured to the frame but does not interfere with the opening or closing of the airport whether the windscoop is in open or closed position.

It will be apparent that a similar construction may be employed with airports of rectangular or of other outline. This change in shape and many other changes which may be made in the several parts, their relative size, shape and location may be made without departing from the spirit of my invention as set forth in the following claims.

I claim:

1. The combination with an airport frame and the glass holder carried thereby, of a windscoop rigidly secured within said frame, said windscoop comprising a plurality of interleaved plates having a width substantially equal to the depth of said frame, means at opposite points on said frame for pivotally supporting said plates, and means for limiting the relative angular movement of adjacent pairs of said plates, the plates and pivotal supporting means being constructed and arranged to permit the closing of said glass holder while the windscoop is in place in said frame.

2. The combination with an airport frame and a glass holder pivotally carried thereby, of a windscoop rigidly secured within said frame and lying outside of the space into which the glass holder may be moved, said windscoop comprising a plurality of interleaved plates, means secured to opposite points of said frame for pivotally supporting the opposite ends of said plates, and means for limiting the relative angular movement of said plates.

3. A windscoop comprising a plurality of interleaved plates, bearing sleeves passing through the respective ends of said plates, said sleeves being adapted to be mounted at diametrically opposite points of an airport frame, means preventing rotation of said sleeves, a washer carried on each sleeve, each washer being non-rotatable with respect to its respective sleeve, and a threaded member passing through the respective sleeves for attaching the windscoop in an airport frame.

4. A windscoop comprising a plurality of interleaved plates, threaded members passing through the ends of said plates for attaching the same in a frame, a non-rotatable sleeve surrounding each of said threaded members, a spring washer at the inner end of each threaded member, and a non-rotatable washer between each spring washer and the adjacent plate.

In testimony whereof, I affix my signature.

HAROLD F. NORTON.